United States Patent
Church

[11] Patent Number: 6,132,493
[45] Date of Patent: Oct. 17, 2000

[54] APPARATUS AND METHOD FOR WASHING AIR WITH A LIQUID WITHOUT AN ELIMINATOR

[76] Inventor: C. Daniel Church, 1723 Brookhaven Mill Rd., Greensboro, N.C. 27406

[21] Appl. No.: 09/129,579

[22] Filed: Aug. 5, 1998

[51] Int. Cl.[7] .......................... B01D 45/14; B01D 47/02; B01D 50/00
[52] U.S. Cl. ................................. 95/198; 95/222; 95/226; 95/270; 95/272; 95/218; 96/333; 96/350; 96/351; 96/358; 96/359
[58] Field of Search .............................. 96/247, 245, 265, 96/333, 348, 350, 351, 352, 353, 354, 358, 359, 360, 278, 279; 95/187, 198, 218, 222, 226, 270, 272

[56] References Cited

U.S. PATENT DOCUMENTS

| | | |
|---|---|---|
| 1,314,564 | 9/1919 | Bellville et al. . |
| 1,349,608 | 8/1920 | Donaldson . |
| 1,824,713 | 9/1931 | Fisher et al. . |
| 2,004,467 | 6/1935 | Hawley ........................................ 95/226 |
| 2,213,881 | 9/1940 | Lauer ........................................... 96/350 |
| 2,250,226 | 7/1941 | Juelson ......................................... 183/8 |
| 3,286,444 | 11/1966 | Boswinkle et al. ........................ 55/215 |
| 3,522,692 | 8/1970 | Brookman et al. ........................ 55/233 |
| 3,557,535 | 1/1971 | Howick ...................................... 55/237 |
| 3,585,786 | 6/1971 | Hardison .................................... 96/359 |
| 3,702,048 | 11/1972 | Howick ....................................... 55/92 |
| 3,717,979 | 2/1973 | Waters ....................................... 55/233 |
| 4,547,206 | 10/1985 | Sovis et al. ................................ 55/255 |
| 4,721,516 | 1/1988 | Barsacq ...................................... 96/351 |
| 4,784,676 | 11/1988 | Hale ........................................... 55/255 |
| 4,818,259 | 4/1989 | Marano ...................................... 55/227 |
| 5,192,344 | 3/1993 | House ......................................... 55/216 |
| 5,205,846 | 4/1993 | Fabrizi ....................................... 96/249 |

OTHER PUBLICATIONS

Greenheck Brochure entitled "Plenum Fans Class I, II & III Horizontal, Vertical Motor on Frame" Mar. 1994.
Greenheck Brochure entitled "Plug Fans" Jul. 1997.

*Primary Examiner*—David A. Simmons
*Assistant Examiner*—Robert A. Hopkins
*Attorney, Agent, or Firm*—Rhodes & Mason, PLLC

[57] ABSTRACT

An air washer includes an upwardly-open vessel for holding an air washing liquid. An air inlet opening into the upwardly open vessel introduces air to be washed below the upper level of the air washing liquid, and a chamber above the upper level of air washing liquid has inner and outer walls. A fan spaced from the upper level of air washing liquid is positioned within the outer wall of the chamber. The fan pulls an air flow through the inner wall of the chamber and exhausts it to an exhaust path downstream of the fan. Operation of the fan induces air to pass through the inlet and to be washed by the air washing liquid in the vessel and to pass through the chamber to the fan and then to be exhausted through the exhaust path. Air washing liquid entrained as liquid droplets in the cleaned air is propelled outwardly by the fan and centrifugally removed from the cleaned air. The cleaned air exhausting through the exhaust path is substantially free of entrained liquid droplets, and the liquid that is propelled outwardly by the fan traverses a liquid return path to the vessel.

4 Claims, 2 Drawing Sheets

APPARATUS AND METHOD FOR WASHING AIR WITH A LIQUID WITHOUT AN ELIMINATOR

BACKGROUND OF THE INVENTION

The present invention relates generally to improvements in air washers such as those used for cleaning and/or humidifying or otherwise treating air or other gaseous volumes with liquid such as water.

Conventional air washing equipment generally includes an air handling apparatus for driving the air to be washed through ductwork equipped with nozzles that spray an air washing liquid in a droplet or aerosol form for intimate contact between the air and the air washing liquid. This treatment can be very effective in causing such intimate contact, but typically results in some of the liquid being entrained in the moving air in droplet form. When the washed air is to be returned, these droplets are undesirable and it is, therefore, necessary to provide a further apparatus called an eliminator to eliminate the water droplets from the moving air. Typically, such devices are screens or baffles which add expense to the apparatus.

If the expense of the eliminator could be avoided, substantial savings may be realized to the benefit of the manufacturers and users of the air washer.

SUMMARY OF THE INVENTION

The present invention fulfills this need in the art by providing an air washer including an upwardly-open vessel for holding an air washing liquid so that the air washing liquid has an upper level, an air inlet opening into the upwardly open vessel for introducing air to be washed below the upper level of the air washing liquid, a chamber above the upper level of air washing liquid, a fan spaced from the upper level of air washing liquid and positioned to pull an air flow through an air flow path through the chamber when the fan operates; and an exhaust path downstream of the fan for exhaust air driven by the fan. Operation of the fan induces air to pass through the inlet and to be washed by the air washing liquid and to pass through the chamber to the fan and then to be exhausted through the exhaust path and air washing liquid entrained as liquid droplets in the cleaned air is propelled outwardly by the fan for centrifugal removal from the cleaned air so that the cleaned air exhausting through the exhaust path is substantially free of entrained liquid droplets.

The apparatus is preferably free of spray nozzles. Typically, the upwardly open vessel, the chamber and the fan are vertically aligned.

The chamber may include a liquid return path separate from the air flow path for returning the liquid that is propelled outwardly by the fan to the vessel. The chamber may have inner and outer walls, with the liquid return path defined by a space between inner and outer walls. The outer wall may extend upwardly into radial alignment with the fan so as to intercept droplets propelled outwardly by the fan.

Preferably, the fan is a plug fan or a plenum fan.

The invention also provides a method of treating a gas with a liquid including holding a quantity of the liquid in a vessel to define an upper level of liquid, rotating a fan to remove gas downstream from a chamber above the upper level to an exhaust axially downstream of the fan, bubbling the introduced gas through the liquid so it is treated and passes upwardly through the upper level of the liquid into the chamber, along with some liquid droplets, attracting the treated gas and liquid droplets to the rotating fan, radially directing the droplets by the rotating fan for interception and collection and axially directing the treated gas to the exhaust.

The method is preferably characterized by the absence of spraying of the liquid through nozzles.

Typically, the method includes returning liquid from the radially directed droplets to the vessel. This may entail returning the liquid through a liquid return path between inner and outer walls of the chamber. Desirably, the method includes intercepting the radially directed droplets with the outer wall of the chamber.

Preferably, the rotating step includes rotating a plug fan or a plenum fan.

The method may include supplying air washing liquid to the liquid to maintain the upper level substantially constant.

In another embodiment of the method, the step of returning liquid from the intercepted droplets directs them along a liquid return path that is a part of the air flow path to the vessel.

The method may also include directing cleaned air to the fan along an inlet cone and returning intercepted liquid through a drain hole in the inlet cone.

The method may also include deflecting the cleaned air into a non-linear path in the chamber to cause larger liquid droplets to leave the cleaned air.

BRIEF DESCRIPTION OF THE DRAWINGS

The present invention will be better understood from a reading of the detailed description of the invention in connection with a review of the drawings, in which.

DESCRIPTION OF THE PREFERRED EMBODIMENTS

Figure 1:
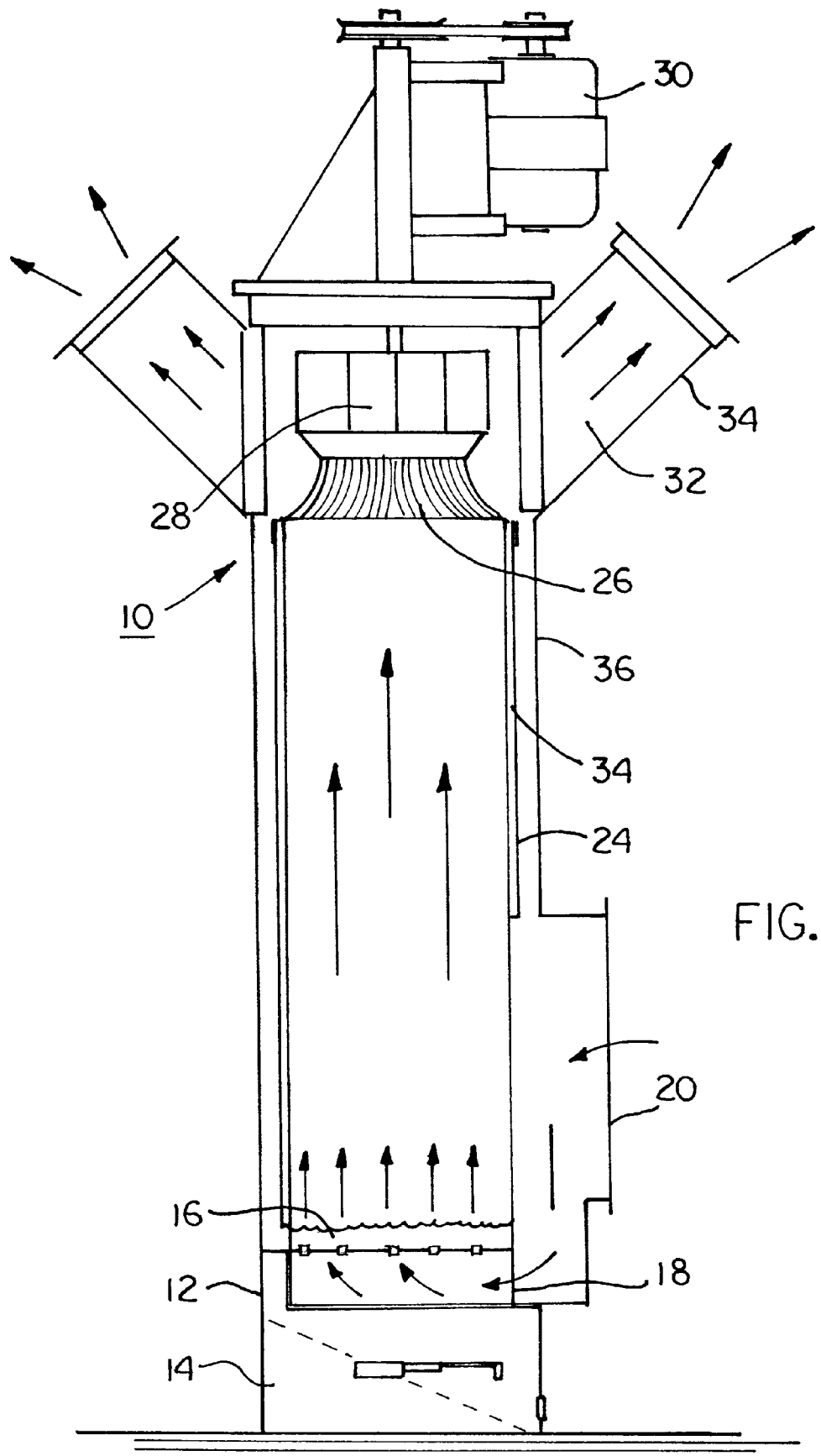
FIG. 1 is an elevational schematic view of an embodiment of an air washer in accordance with one embodiment of the invention.

As seen in FIG. 1, an embodiment 10 of an air washer in accordance with one embodiment of the present invention can be seen. The apparatus 10 includes a vessel 12 in its lower portion adapted to hold an air washing liquid 14, such as water. Throughout this application, the air washing liquid may from time to time be referred to as water, although it is understood that any suitable air washing liquid can be substituted. The water 14 as provided in the vessel 12 is sufficient to rise to a water level 16. The vessel 12 is provided with an air inlet 18 connected to duct work 20, which is adapted to deliver air to be washed to the apparatus 10. The inlet 18 is located in the vessel 12 so as to always be below the water level 16. The space between the inlet 18 and the water level 16 should be selected to be sure that there is sufficient water to prevent a direct air flow path that pushes the water out of the way, but not so great as to interfere with the effective drawing in of air through the inlet 18. In addition, the inlet 18 may be provided with distribution openings as desired to maximize the intimate contact between the air and the water.

Above the vessel 12 is a chamber 24 topped by a fan assembly 25. The fan assembly 25 includes the fan itself 28 and a inlet cone 26 to direct the air to the fan 28. The fan 28 is driven by a motor 30 through any desired linkage arrangement.

The fan assembly 25 must be provided without peripheral side walls and it is strongly preferred that the fan assembly be a plug plan or plenum fan, since those types of fans are conventionally used in air handling and are free of such peripheral walls.

The fan 28 propels the air radially outwards through outlet ducts 32. Any water droplets entrained with the air are similarly radially propelled, but the change in direction from a vertical motion to a radial motion, coupled with the mass differential between the water droplets and the air, causes the water droplets to continue outwardly to impact the exhaust duct 32 in the region 34. Being thus outwardly propelled and wetting the surface, the water is removed from the moving air and can drain back down under the influence of gravity. The water continues to drain to the bottom of the exhaust duct 32 and hence into contact with the top of the chamber 24.

In the embodiment of FIG. 1, the chamber 24 is provided with an inner wall 34 and an outer wall 36, with the outer wall 36 being joined with the duct wall 32, so that the draining water can continue down into the space between walls 34, 36, which extend all the way back to the air washing liquid vessel 12. Various other return mechanisms for the liquid can be provided, such as separate piping, or a ring at the top of the chamber 24. Indeed, it is not a requirement that the liquid be returned to the vessel 12, but could disposed of in some other fashion, although maintenance of the water level 16 suggests that such a return is appropriate. However, in some applications, it may be desired to not recycle the liquid or, perhaps, to filter or otherwise treat it before recycling.

Those of ordinary skill in the art will appreciate that various other forms of the invention can be contemplated; in particular, the fan can be located more clearly within the chamber than in the embodiment depicted in FIG. 1. Also, the length of the chamber 24 can be varied as desired, typically, however, it will be long enough in the vertical direction to cause any turbulence at the water surface 16 to be sufficiently spaced from the fan 28 to avoid large amounts of water being drawn into the fan. In addition, if desired, the chamber can be provided with spray nozzles to spray air washing liquid, so that there is further contact between the air washing liquid and air than is provided by the introduction of air below the water level. However, in most cases, such supplemental nozzles will not be needed.

Figure 2:
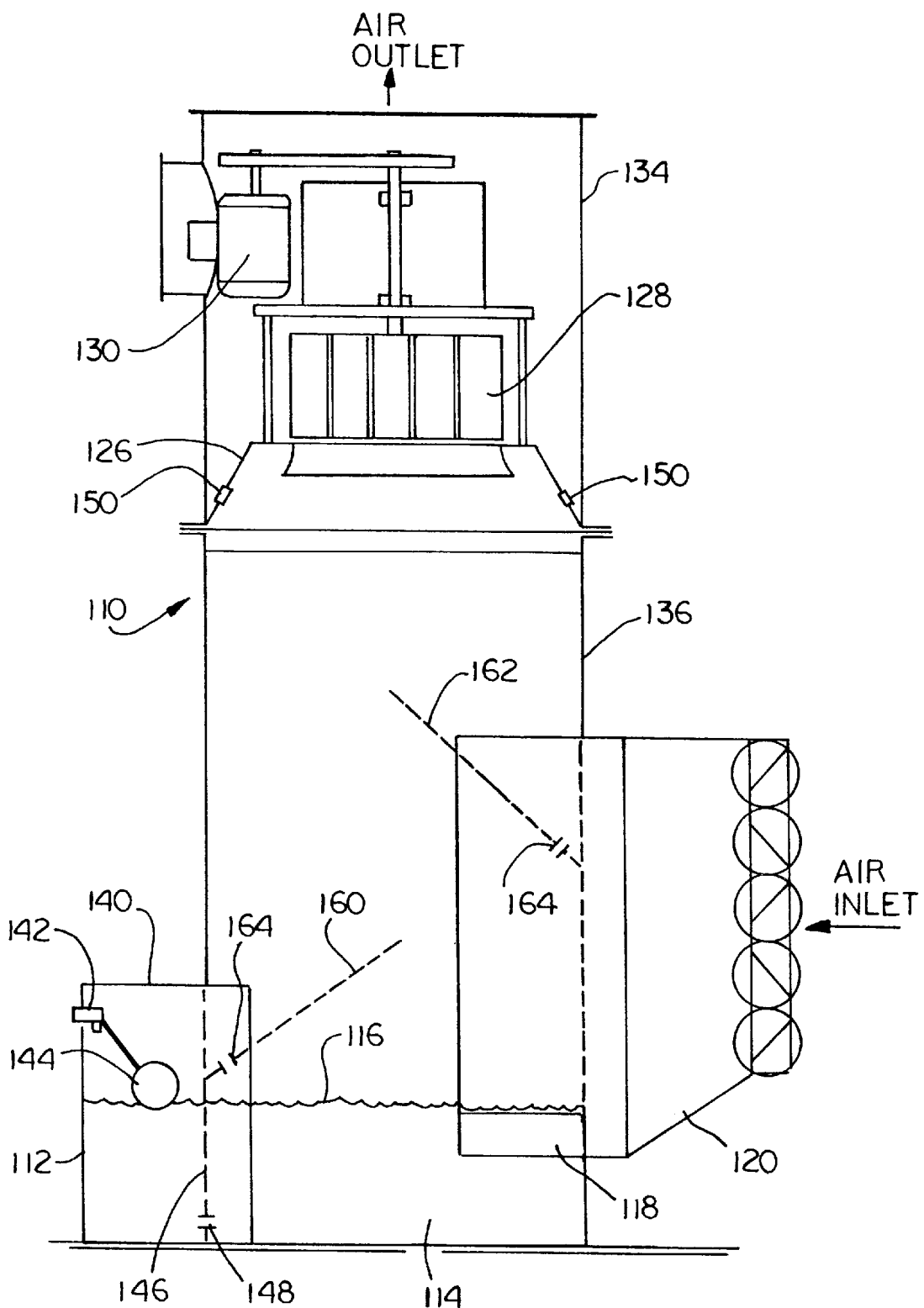
FIG. 2 is an elevational schematic view of an embodiment of an air washer in accordance with a second embodiment of the invention.

Referring now to FIG. 2, an alternate embodiment of the invention is shown, illustrating other features. The features shown in FIG. 2 can be used in the embodiment of FIG. 1, as will be apparent to those of ordinary skill in the art. Similarly, applicable features from the embodiment of FIG. 1 can be used In FIG. 2, as desired. Elements in FIG. 2 that are like those in FIG. 1 are referred to with the same reference numeral, incremented by 100.

The apparatus 110 includes a vessel 112 adapted to hold air washing liquid 114. In this embodiment, there is a liquid level maintenance chamber 140. That apparatus includes a water make-up inlet 142 controlled by a float valve 144 housed in the chamber 140 separated from the vessel 112 by partition 146. A passageway 148 allows for the equalization of the liquid levels on both sides of the partition 146. Thus, if the liquid level 116 drops, the float valve 144 will drop, opening the inlet 142 to allow additional liquid to be introduced, restoring the liquid level 116 to its desired height, at which time the float valve 144 closes to halt further in-feeding of liquid.

The air to be washed is supplied in a duct 120, which, if desired, can have various dampers or louvers to modulate the air flow and mix air from various sources to the air washer. The air passes through the liquid 114 and up into chamber 136, where it is directed by inlet cone to plenum fan 128, driven by motor 130. Radially outward walls 134 intercept any water droplets centrifugally thrown by the plenum fan 128. The water can return through drain holes 150 to the chamber 136. As can be appreciated, the return holes 150 open into the chamber 136 so that the draining is in the same general path (albeit countercurrent) as the upward air flow.

The embodiment of FIG. 2 is also provided with deflectors 160 and 162, which deflect the airflow so that it does not follow a linear path from the liquid 114 to the fan 128. The turns required for the air to pass around the deflectors 160 and 162 are not as easily traversed by water turbulence, so that if there is turbulence at the water surface 116, water from that turbulence is much less likely to pass the deflectors 160 and 162. Preferably, further drain holes 164 are provided in the deflectors to permit the water draining from return holes 150 to pass downwardly to the bottom of the vessel 112.

Those of ordinary skill in the art will appreciate that the invention can take various other forms not specifically set forth herein for the sake of conciseness and readability, but all such forms are deemed to be within the scope of this invention.

What is claimed is:

1. An air washer comprising:

an upwardly-open vessel for holding an air washing liquid so that the air washing liquid has an upper level;

an air inlet opening into said upwardly open vessel for introducing air to be washed below the upper level of the air washing liquid;

a chamber above the upper level of air washing liquid;

a fan spaced from the upper level of air washing liquid and positioned to pull an air flow through an air flow path through said chamber when said fan operates;

an exhaust path downstream of said fan for exhaust air driven by said fan; and a liquid return path;

whereby operation of said fan induces air to pass through said inlet and to be washed by said air washing liquid and to pass through said chamber to said fan and then to be exhausted through said exhaust path and air washing liquid entrained as liquid droplets in the cleaned air is propelled outwardly by said fan for centrifugal removal from the cleaned air so that the cleaned air exhausting through said exhaust path is substantially free of entrained liquid droplets;

whereby the entrained liquid droplets that are propelled outwardly by said fan are drained in said liquid return path;

whereby said liquid return path is a part of the air flow path and returns the liquid that is propelled outwardly by said fan to the vessel; and whereby said fan has an inlet cone to direct cleaned air to said fan and said liquid return path includes a drain hole in said inlet cone.

2. An air washer as claimed in claim 1 further comprising an outer wall that extends upwardly into radial alignment with said fan so as to intercept droplets propelled outwardly by said fan.

3. An air washer comprising:

an upwardly-open vessel for holding an air washing liquid so that the air washing liquid has an upper level;

a supply source for air washing liquid, said supply source including a float valve to replenish air washing liquid to maintain the upper level substantially constant;

an air inlet opening into said upwardly open vessel for introducing air to be washed below the upper level of the air washing liquid;

a chamber having a chamber wall and deflectors above the upper level of air washing liquid, a fan spaced from the upper level of air washing liquid and positioned within said chamber, so that the chamber extends upwardly into radial alignment with said fan, said fan being positioned to pull an air flow through an air flow path within said chamber when said fan operates, said upwardly open vessel, chamber and fan being vertically aligned, said fan having an inlet cone to direct cleaned air to said fan; and an exhaust path downstream of said fan for exhaust air driven by said fan, said deflectors being positioned to deflect the cleaned air into a non-linear path to cause larger liquid droplets to leave the cleaned air, said chamber being characterized by the absence of spray nozzles, said chamber including a liquid return path that is a part of the air flow path for returning the liquid that is propelled outwardly by the fan to the vessel; said inlet cone having a drain hole to return liquid along the liquid return path;

whereby operation of said fan induces air to pass through said inlet and to be washed by said air washing liquid in said vessel and to pass through said chamber to said fan and then to be exhausted through said exhaust path, and air washing liquid entrained as liquid droplets in the cleaned air is propelled outwardly by said fan for centrifugal removal from the cleaned air vessel to be intercepted by said chamber wall so that the cleaned air exhausting through said exhaust path is substantially free of entrained liquid droplets and the liquid that is propelled outwardly by the fan is intercepted by said chamber wall to drain through the drain hole and traverse the liquid return path in the air flow path to the vessel.

4. A method of treating a gas with a liquid comprising:

holding a quantity of the liquid in a vessel to define an upper level of liquid;

bubbling the introduced gas through the liquid so it is treated and passes upwardly through the upper level of the liquid into a chamber above the upper level, along with some liquid droplets; and rotating a fan to remove gas downstream from the chamber to an exhaust axially downstream of the fan;

radially directing the liquid droplets by the rotating fan for interception and collection and axially directing the treated gas to the exhaust;

draining the collected liquid droplets in a liquid return path; and directing cleaned air to the fan along an inlet cone and returning intercepted liquid through a drain hole in the inlet cone.

\* \* \* \* \*